F. N. PIKE.
APPARATUS FOR WINDING ARMATURES FOR DYNAMOS AND MOTORS.
APPLICATION FILED MAY 18, 1909.
1,048,205.
Patented Dec. 24, 1912.
4 SHEETS—SHEET 2.
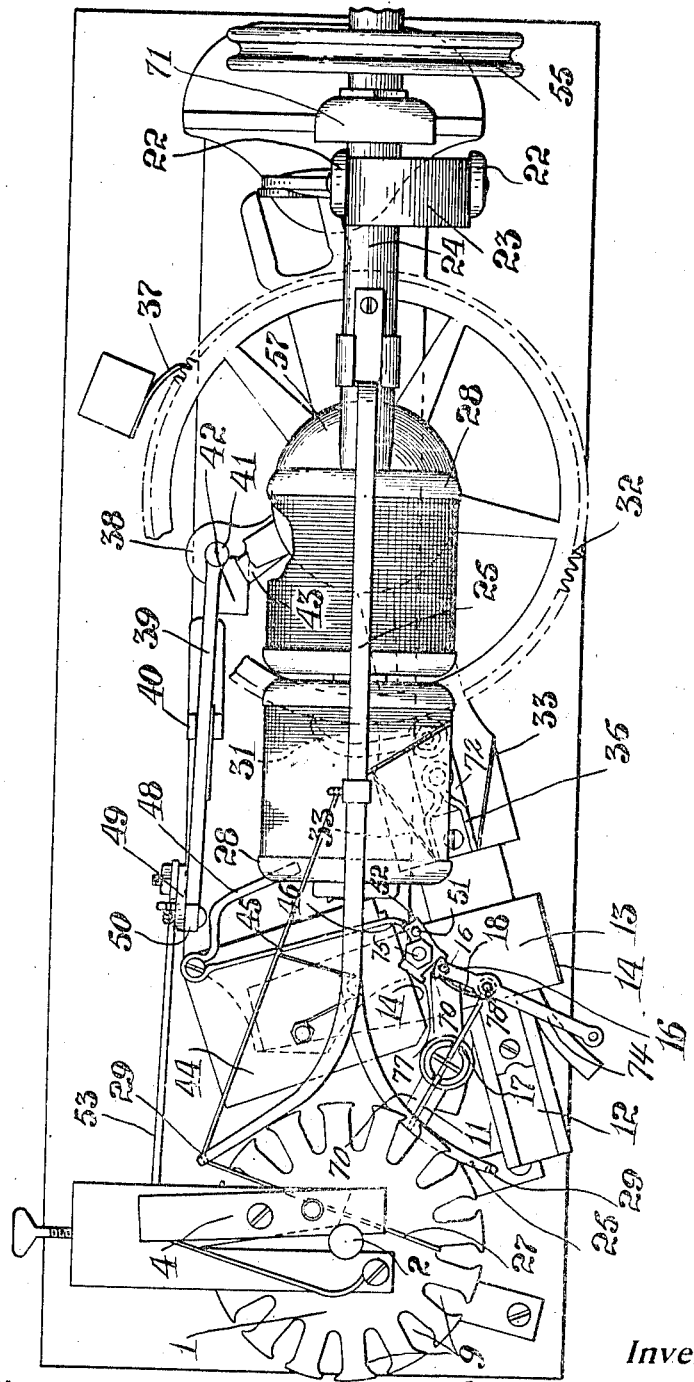

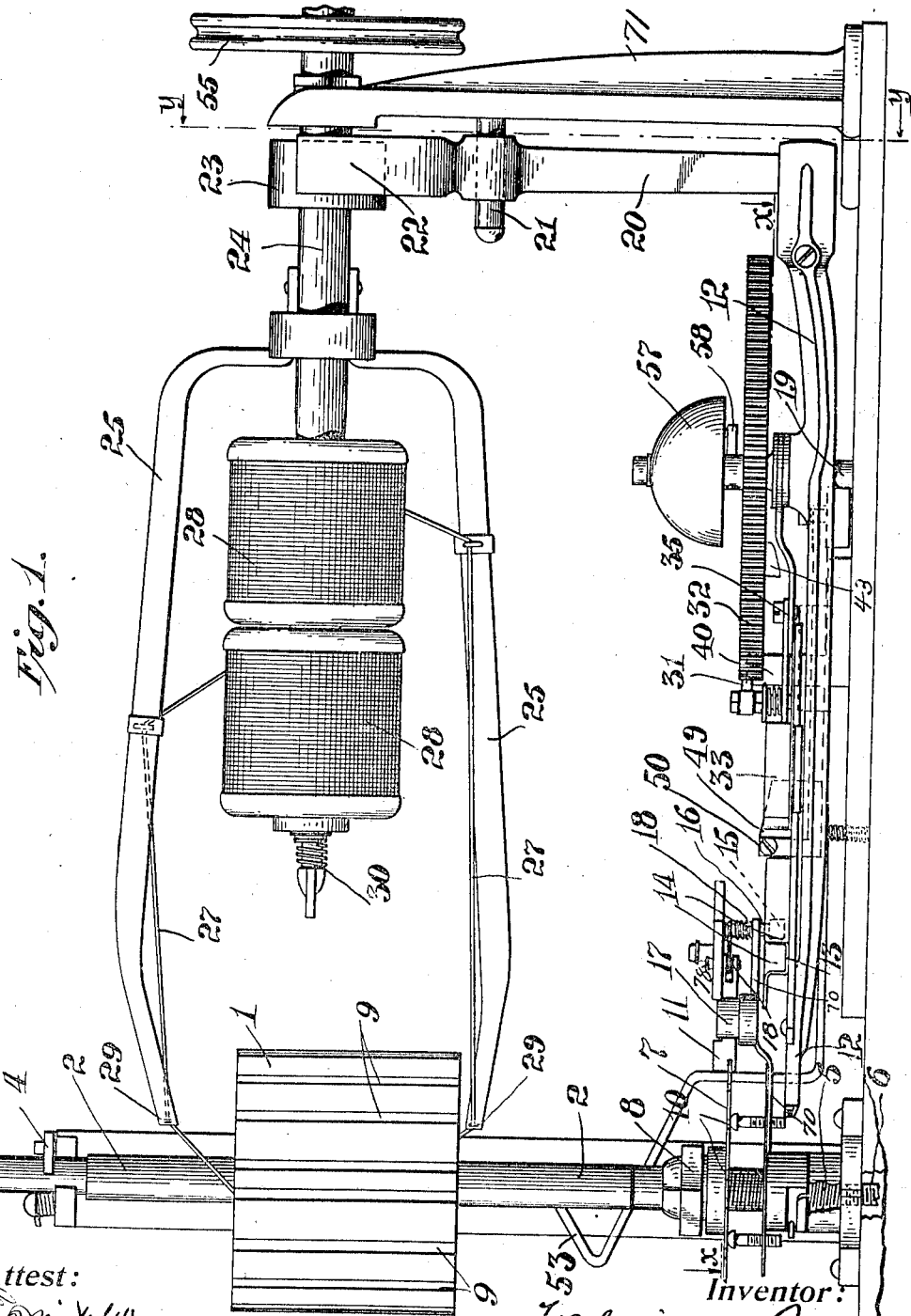

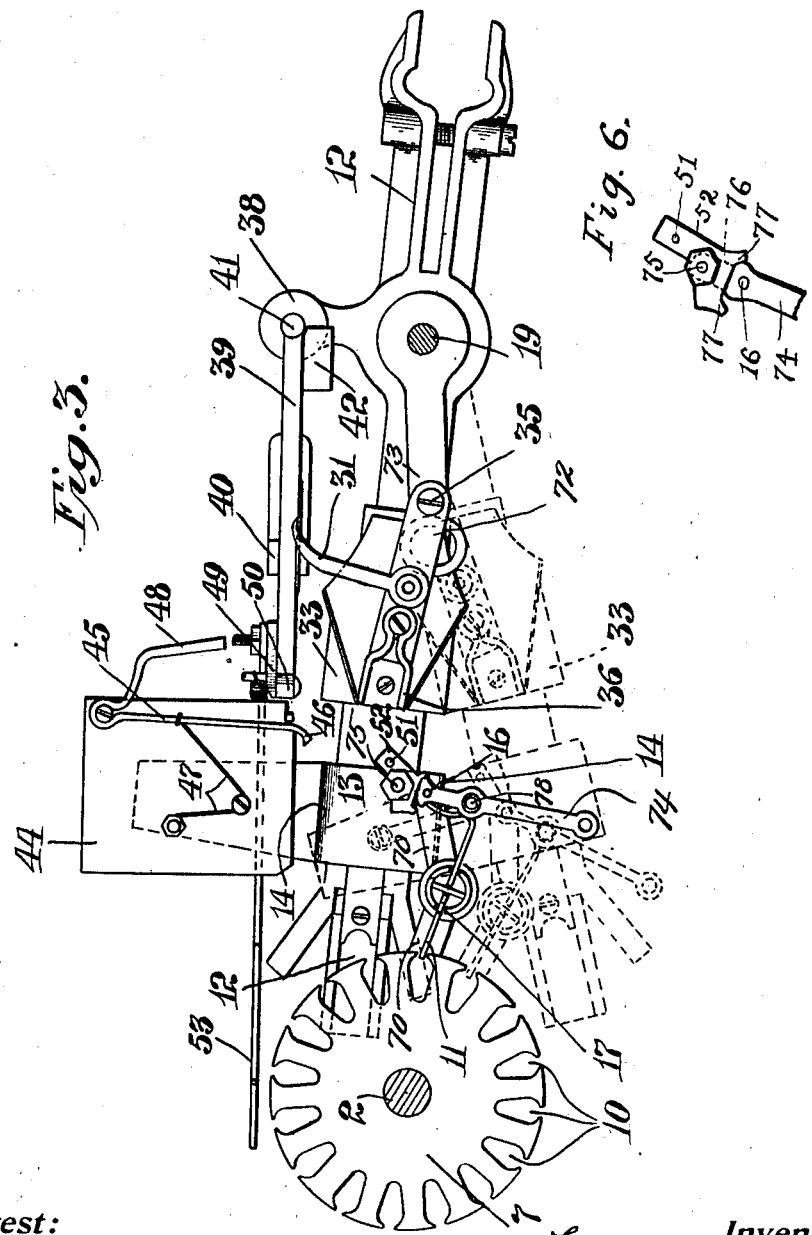

F. N. PIKE.
APPARATUS FOR WINDING ARMATURES FOR DYNAMOS AND MOTORS.
APPLICATION FILED MAY 18, 1909.

1,048,205.

Patented Dec. 24, 1912.
4 SHEETS—SHEET 4.

Attest:

Inventor:
Frederick N. Pike
by E. N. Dickerson
Atty

UNITED STATES PATENT OFFICE.

FREDERICK N. PIKE, OF NEW YORK, N. Y., ASSIGNOR OF ONE-THIRD TO E. N. DICKERSON, OF STOVALL, NORTH CAROLINA.

APPARATUS FOR WINDING ARMATURES FOR DYNAMOS AND MOTORS.

1,048,205.   Specification of Letters Patent.   Patented Dec. 24, 1912.

Application filed May 18, 1909. Serial No. 496,798.

*To all whom it may concern:*

Be it known that I, FREDERICK N. PIKE, a citizen of the United States, residing at New York, in the county and State of New York, have invented new and useful Improvements in Apparatus for Winding Armatures for Dynamos and Motors, of which the following is a specification.

This invention relates to new and useful improvements in an apparatus for winding armatures for dynamos and motors.

It relates especially to a machine for winding armatures having slotted cores, into which slots the generating wire is expected to be wound. Armatures of this class are mounted upon a spindle or shaft and consequently it is impossible to wind a coil through one slot and then through the slot directly opposite on account of the interference of the armature shaft, consequently it is customary to wind the wire through one slot and then through the slot next to the one opposite the slot through which the wire first passes. The ordinary method of winding such armatures is by hand, mounting the spindle between lathe centers and turning the spindle in the centers, as the conditions of winding require.

In my invention I arrange an apparatus in which the spindle rests in fixed centers and is capable of automatic rotation in such centers, whereas the wire which passes through a winding flier is rotated in the same plane following a circular course. This winder is so directly connected with the spindle adjusting mechanism that, after the wire has been laid in a groove, the spindle is automatically shifted the proper number of degrees of rotation to suit the armature. In the apparatus shown the rotation is one-sixteenth of a circle. In this way, when the wire is laid in the second part of its revolution, it reaches a slot not directly opposite the first slot, but adjacent thereto.

My invention will be readily understood from the accompanying drawings, in which—

Figure 1 represents a vertical elevation, Fig. 2 a plan view, Fig. 3 is a cross section on the line $x$—$x$ of Fig. 1. Fig. 4 a cross section on the line $y$—$y$ Fig. 1. Fig. 5 a view of a modification showing the machine driven by a pulley instead of by hand and the spool of wire carried on the outside of the bearing. Fig. 6 is an enlarged detail view, showing the mounting of one of the levers included in the apparatus.

In said drawings, the armature core 1 is shown as mounted on a vertical shaft 2 whose upper portion is engaged by a clamp bearing 4, the lower end of the shaft being removably seated in a socket member 5, provided with a center 6, from which member the shaft, and with it the armature core, may be withdrawn when said clamp is opened.

Below the core there is affixed to shaft 2, by means of a chuck 8, a disk or plate 7 formed with a series of guide slots 10 that correspond in number and position to the core slots 9. To oscillate said plate and, also, the shaft and core, there is provided a mechanism which preferably comprises a pawl 11, and a swinging arm 12 for actuating the same. The pawl 11 is slidably engaged in a suitable support 17, that serves to guide it during its endwise movements, and is forced into locking position in slots 10 by a spring 18, here shown as coiled around the upper portion of a pin 16 hereinafter described, one end of this spring being positively connected to the adjacent end of the pawl so as to exert its tension thereagainst. The aforesaid support is carried by a member 70 which is loosely attached to shaft 2. The lateral movements of the pawl requisite to produce the oscillation of the core are effected, in the present instance, by a pin 16 secured to member 70 and projecting above and below the same, said pin carrying at its lower end a roller 15 which is alternately engaged by a pair of spaced lugs 14 provided upon a transverse plate 13 affixed to the adjacent end of arm 12. Said arm itself is mounted upon a pivot 19 and is connected at its other end with the lower end of a vertical arm 20 that is pivoted at 21 to a standard 71 mounted upon the base of the apparatus. The upper end of arm 20 is provided with spaced jaws 22 which straddle a cam 23 secured to the horizontal winding shaft 24 that is journaled in said standard. This shaft carries the winding flier 25 and may, if desired, be formed with a bore 26, (see Fig. 5). The spool 28 from which the wire 27 is drawn, may be mounted either upon a bracket secured to the driving pulley 55 carried by shaft 24, or upon said shaft between the standard and the armature core, a suitable tension device 30 being employed in the latter construction which is illustrated in Figs. 1 and 2, wherein two such spools are shown. The arm or arms of the flier are provided with the terminal eye or eyes 29, and the flier itself may be so adjusted as to move the wire in a circular path large enough to pass outside of the core.

The above-described arrangement is such, therefore, as to produce a to-and-fro swinging movement of arm 12, during rotation of shaft 24, through the intermediary of parts 23, 22, and 20, and the connection of the last-named part with said arms, the movement of the latter effecting, in turn, an oscillation of plate 7, core 1 and shaft 2 by means of plate 13 and its lugs 14, pin 16 and pawl 11.

In order to provide for the requisite number of turns of wire being laid in each pair of core slots, there is employed a toothed wheel 32 that is engaged by a pawl 31 whose operative stroke may be adjusted to feed said wheel two, three, four or any other desired number of teeth within the limitations of the wheel. This wheel has operatively associated with it a mechanism, hereinafter described, which serves to automatically rotate the core one step after one pair of slots have been filled, so as to bring the next pair of slots into the circular path of the flier. As shown in Fig. 3, pawl 31 is mounted upon an arm, or similar member, 72 that is pivoted at 35 to a fixed bracket 73, said member 72 being provided with a projection 36 that is alternately engaged by the two shoulders formed on an angle piece 33 adjustably mounted on arm 12. By adjusting the position of this angle piece on said arm, the extent of the swinging movement of the pawl, and, hence, of the rotary or feed movement of the toothed wheel, can be regulated at will. To preclude retrograde movement of the wheel, a suitable pawl 37 is provided. Means are also made use of to denote the completion of a revolution of said wheel, or, in other words, the exact moment when the requisite number of turns of wire have been laid in each pair of core slots, an audible signal being preferably utilized, which is here shown as consisting of a bell or gong 57 adapted to be struck at the proper time by a hammer 58; this hammer may be pivoted to the toothed wheel or mounted in any other desired manner, and its free end 59 is designed for engagement by a suitable operating member, in the present instance, the pawl 31.

From the foregoing, it will be apparent, therefore, that during the swinging movement of the main operating arm 12, the toothed wheel will be fed step by step the required number of teeth, while the armature core will be simultaneously oscillated, thus allowing the wire to enter its predetermined slot without crossing the center of the armature shaft. Owing, however, to the lost motion occasioned by the play of pin 16 between the lugs 14 on plate 13, the rotation of the core does not take place during the period in which the wire is being laid in a slot, but while the flier is traveling from its position in laying the wire in one slot to its position in laying the wire in the next slot.

If desired, the apparatus can be made to operate simply with the mechanism heretofore described, the rotation or feeding of the armature core being effected manually after the completion of each revolution of the toothed wheel. The automatically-operated feed mechanism above referred to is, however, preferably employed, and in that instance the signal device may be omitted as being unnecessary. The mechanism just mentioned includes as its main operating member a feeding rod 39 which is loosely pivoted at its rear end, as indicated by the numeral 41, to an arm 38 projecting laterally from arm 12 and rigidly connected thereto. Rod 39 is supported centrally by a fulcrum 40 in which it is arranged for both longitudinal and rocking movement, its pivotal connection with arm 38 being of such a character as to permit the latter movement, which movement is effected by the passage of a beveled lug 43 on the under face of wheel 32 over the corresponding beveled or bent portion 42 on said rod directly adjacent pivot 41.

At its forward end, rod 39 is provided with a shoulder piece 49 having a cam-surfaced upper end 50 which is designed for coöperation with the adjacent portion 48 of a lever 45, as hereinafter described, said lever being pivoted to a suitable support 44 carried by plate 13, and being normally forced away from the armature core by the action of a spring 47. The opposite portion of said lever from the portion indicated by the numeral 48 is formed with a terminal hook 46 that is adapted to engage the lower end of a depending pin 51 carried by a small angle lever 52 pivoted at 75 adjacent its apex to an extension 76 of a second lever 74 which is operated by lever 52 and, in the construction illustrated, is loosely pivoted on the upper end of pin 16 carried by said member 70, although it may be pivoted in any other desired manner to that member, as will be understood. The long arm of lever 52 is free. Lever 74 which has a slight rocking movement only, is directly connected at one end to a depending pin 78 secured to pawl 11 intermediate the ends of the latter and its operative coaction with lever 52 is due to the shape of the head or apex of the latter lever, said head being provided with two spaced projections 77 which extend upon opposite sides of that portion of lever 74 through which pin 16 passes. The operation of these parts is substantially as follows: When the rear end of rod 39 is depressed by the passage of the member 48 across the member 42, the front end of said rod will, of course, be raised. This movement takes place at the same time that arm 12 swings away from rod 39 into its dotted line position shown in Fig. 3, and that said rod moves forward. As the rod end rises, its shoulder 50 is brought into position to engage the part 48 of lever 45, against which shoulder said part is held by the action of spring 47 during the succeeding rearward movement of the rod and the swinging movement of arm 12 toward said rod. When arm 12 again swings away from the rod and the latter moves forward, the hook 46 on lever 45 will engage pin 51 carried by lever 52, and will initially rock that lever slightly upon its pivot 75 until one of its projections 77 engages lever 74. The continued movement of arm 12 and rod 39 in the direction specified will then cause the pressure exerted by lever 45 on lever 52 to be transmitted through the latter to the extension end 76 of lever 74, (since lever 52 is mounted on that end of lever 74 and is then pressed against the same), with the result that lever 74 is rocked in a counterclockwise direction upon its pivot 16 and thus withdraws pawl 11 from its slot in plate 7, said pawl being then moved toward and slightly beyond the next slot in said plate. As member 43 disengages member 42, the front end of rod 39 will drop, thereby disengaging shoulder 50 from the part 48 of lever 45, whereupon that lever will assume its normal position under the influence of spring 47, and when said rod again moves rearwardly and arm 12 swings toward it, pawl 11 will be forced into the new slot, on reaching the same, and the oscillation of the core will be continued as before.

It will be seen, therefore, that the feeding pawl 11 has two distinct movements, namely, a lateral oscillatory movement which is effected by the coaction of pin 16 with the lugs 14 on plate 13, and an endwise or forward and backward movement which is produced by the actuation of lever 74 and the pressure of spring 18.

There is finally provided a loop-forming device which is operative at the completion of each revolution of the toothed wheel 32, that acts as the counter for the turns of wire. This device may advantageously comprise a suitably bent hook member 53 which is secured to the front end of the feeding rod 39, and is, therefore, moved forward and backward with said rod and rises and falls with the rod end. Consequently, a loop will be drawn or formed in the wire at each operation of the hook, as shown in Fig. 4, which loop is adapted to be attached to the commutator in the usual manner.

The operation of the entire apparatus is believed to be apparent from the foregoing, and, hence, to require no further explanation. It is to be understood, however, that no limitations to the exact construction and arrangement of parts shown and described are contemplated, other than those which are imposed by the appended claims.

What I desire to claim as my invention and secure by Letters Patent, is:—

1. In an automatic winding mechanism, the combination of an armature support; and feed mechanism for intermittently rotating said support comprising a rocking arm, a pawl operated thereby when said arm is rocked, a pivotally-mounted arm actuated by said pawl, and a feeding pawl operated by said pivotally-mounted arm.

2. In a winding apparatus, the combination of a shaft adapted to support the core of an armature; a guide secured to said shaft and provided with a series of peripheral slots corresponding in position and number with the slots in said core; a flier for laying the wire in the core slots; means for rotating said flier; a swinging arm; a pawl operatively associated with said arm and engaged with the slots in said guide; and means for swinging said arm forward and backward to oscillate said guide, shaft and core.

3. In a winding apparatus, the combination of a shaft adapted to support the core of an armature; a guide secured to said shaft and provided with a series of peripheral slots corresponding in position and number with the slots in said core; a flier for laying the wire in the core slots; means for rotating said flier; a swinging arm; a toothed counting wheel; a pawl engaging with said wheel for imparting a step-by-step rotary movement to the same; a pawl engaged with the slots in said guide; means for swinging said arm backward and forward; and separate operating connections between said arm and each of said pawls.

4. In a winding apparatus, the combination of an armature core support; a flier for laying the wire in the slots in said core; means for rotating the flier; a toothed counting wheel; a feeding pawl engaging the teeth thereof; a pivotally mounted arm carrying said pawl; a swinging arm provided with a pair of spaced lugs arranged to alternately engage the first-named arm upon opposite sides for oscillating said pawl; and means for operating the second-named arm.

5. In a winding apparatus, the combination of an armature support, and feed mechanism for intermittently rotating said support comprising a swinging arm and means for actuating same, a tiltable arm, a rotatable member, a member actuated by the swinging arm for rotating the first-named member, means carried by said first-named member for periodically tilting the tiltable arm, a feeding pawl, and connections between said tiltable arm and said feeding pawl for operating the latter from the former.

6. In a winding apparatus, the combination of an armature support; a feeding pawl associated with said support for oscillating and periodically rotating same; a swinging arm and operating means therefor; and separate means operatively connected with said arm for imparting lateral and endwise movements to said pawl.

7. In a winding apparatus, the combination of an armature support; a feeding pawl associated therewith; a swinging arm and operating means therefor; a tiltable arm; means operated from said swinging arm for periodically tilting said tiltable arm; connections between said pawl and said swinging arm for oscillating the former; a member connected with said swinging arm and arranged to engage said pawl for moving the pawl endwise, and means on said tiltable arm for actuating said member when that arm is tilted.

8. In a winding apparatus, the combination of an armature support; a feeding pawl associated therewith; a swinging arm and operating means therefor; a tiltable arm; means operated from said swinging arm for periodically tilting said tiltable arm; connections between said pawl and said swinging arm for oscillating the former; a member carried by said swinging arm and provided with a support; a lever pivoted to the last-named support; means provided upon the tiltable arm for operating said lever when that arm is tilted; and means actuated by said lever during its operation for moving said pawl endwise.

9. In a winding apparatus, the combination of an armature support; a feeding pawl associated therewith; a swinging arm and operating means therefor; a tiltable and reciprocatory arm provided with a shoulder; connections between the second- and first-named arms for operating the former from the latter; connections between the first-named arm and the pawl for oscillating said pawl; a member carried by said first-named arm and provided with a support; a lever pivoted to the last-named support and adapted for periodic operative engagement by said shoulder; and means actuated by said lever during its operation for moving said pawl endwise.

10. In a winding apparatus, the combination of an armature support; a slotted guide secured to said support; a feeding pawl arranged to engage the slots in said guide; mechanism for continuously oscillating said pawl; and mechanism associated with the first-named mechanism for periodically withdrawing said pawl from engagement in a slot, to permit said first-named mechanism to shift the pawl into position to engage the succeeding slot.

11. In a winding apparatus, the combination of an armature support; a feeding pawl associated with said support for oscillating same; a swinging arm for operating said pawl; a reciprocatory and tiltable arm; connections between the first-and-second-named arms for operating the latter from the former; and a loop-forming member connected to the second-named arm.

12. In a winding apparatus, the combination of an armature support; a feeding pawl associated with said support for oscillating same; a swinging arm for operating said pawl; a reciprocatory and tiltable arm; connections between the first-and-second-named arms for continuously reciprocating and periodically tilting the latter arm; and a loop-forming member connected to the second-named arm for operation during the tilting movements thereof.

In testimony whereof I have signed this specification in the presence of two subscribing witnesses.

FREDERICK N. PIKE.

Witnesses:
GEO. W. JAEKEL,
FRANK E. RAFFMAN.